(12) United States Patent
Matsuhisa et al.

(10) Patent No.: US 8,381,978 B2
(45) Date of Patent: Feb. 26, 2013

(54) BAG SUPPORTING TABLE AND APPARATUS WITH BAG SUPPORTING TABLE

(75) Inventors: Kaoru Matsuhisa, Shizuoka (JP); Toshiyasu Terahara, Shizuoka (JP); Yuuki Kawaguchi, Shizuoka (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 168 days.

(21) Appl. No.: 12/942,160

(22) Filed: Nov. 9, 2010

(65) Prior Publication Data

US 2011/0114727 A1 May 19, 2011

(30) Foreign Application Priority Data

Nov. 13, 2009 (JP) .................................. 2009-260103

(51) Int. Cl.
*G06K 7/00* (2006.01)
(52) U.S. Cl. .......................................... 235/435; 705/17
(58) Field of Classification Search .................. 235/435; 705/17; 225/96
See application file for complete search history.

(56) References Cited

U.S. PATENT DOCUMENTS

| 6,167,381 A * | 12/2000 | Swaine et al. ................ 705/17 |
| 2002/0185513 A1 * | 12/2002 | Morris ............................ 225/96 |

FOREIGN PATENT DOCUMENTS

| JP | 55-134917 | 9/1980 |
| JP | 07-093461 | 4/1995 |
| JP | 08-080923 | 3/1996 |
| JP | 11-110470 | 4/1999 |
| JP | 11-353408 | 12/1999 |
| JP | 2004-184639 | 7/2004 |
| JP | 2004-266621 | 9/2004 |
| JP | 2006-034765 | 2/2006 |
| JP | 2007-226498 | 9/2007 |
| JP | 2008-146598 | 6/2008 |

OTHER PUBLICATIONS

Japanese Office Action for Japanese Application No. 2009-260103 mailed on Oct. 4, 2011.
Japanese Office Action for Japanese Application No. 2010-161624 mailed on Nov. 22, 2011.
Japanese Office Action for Japanese Application No. 2009-260103 mailed on Apr. 23, 2012.

* cited by examiner

*Primary Examiner* — Karl D Frech
(74) *Attorney, Agent, or Firm* — Turocy & Watson, LLP (57) ABSTRACT

According to one embodiment, a bag supporting table includes a pair of hooking sections configured to support a shopping bag and an auxiliary-bag supporting section. The shopping bag has a pair of grips. The pair of hooking sections are spaced apart from and opposed to each other. The pair of hooking sections respectively hook the grips of the shopping bag and support the shopping bag. The auxiliary-bag supporting section is arranged on the outer side of an arrangement area for the shopping bag supported by the pair of hooking sections.

10 Claims, 9 Drawing Sheets

BAG SUPPORTING TABLE AND APPARATUS WITH BAG SUPPORTING TABLE

CROSS-REFERENCE TO RELATED APPLICATION

This application is based upon and claims the benefit of priority from the prior Japanese Patent Application No. 2009-260103, Nov. 13, 2009 the entire contents of which are incorporated herein by reference.

FIELD

Embodiments described herein relate generally to a bag supporting table and an apparatus with bag supporting table.

BACKGROUND

In the past, in a retail store such as a supermarket, a bagging work table is set near a checkout apparatus operated by a store clerk to perform checkout. A customer jams checked-out commodities in a register bag while opening the register bag by herself or himself on the bagging work table.

Auxiliary bags such as plastic bags for storing water-containing commodities and the like such as fish and fruit are set on the bagging work table. The customer can prevent, by putting the water-containing commodities in the register bag while storing the same in the auxiliary bags, moisture of the water-containing commodities from adhering to other commodities in the register bag.

In recent years, a self-checkout system for performing checkout according to operation of a customer is started to be widespread. The self-checkout system includes a bag supporting table that supports a register bag in an opened state. The self-checkout system realizes facilitation of customer's work for jamming commodities, commodity codes of which are scanned by a scanner, in the register bag (see, for example, JP-A-2007-226498).

DETAILED DESCRIPTION

The bag supporting table in the past explained above is inconvenient because the auxiliary bags for storing water-containing commodities and the like are not set and the customer cannot use the auxiliary bags.

An embodiment realizes improvement of convenience of a bag supporting table that supports a shopping bag in an opened state.

In general, according to one embodiment, a bag supporting table includes a pair of hooking sections configured to support a shopping bag and an auxiliary-bag supporting section. The shopping bag has a pair of grips. The pair of hooking sections are spaced apart from and opposed to each other. The pair of hooking sections respectively hook the grips of the shopping bag and support the shopping bag. The pair of hooking sections support the shopping bag in an opened state. The auxiliary-bag supporting section is arranged on the outer side of an arrangement area for the shopping bag supported by the pair of hooking sections. The auxiliary-bag supporting section supports auxiliary bags different from the shopping bag to allow the auxiliary bags to be detached one by one.

A bag supporting table 1 and an apparatus with bag supporting table A according to an embodiment are explained in detail below with reference to the accompanying drawings.

First Embodiment

Figure 1:
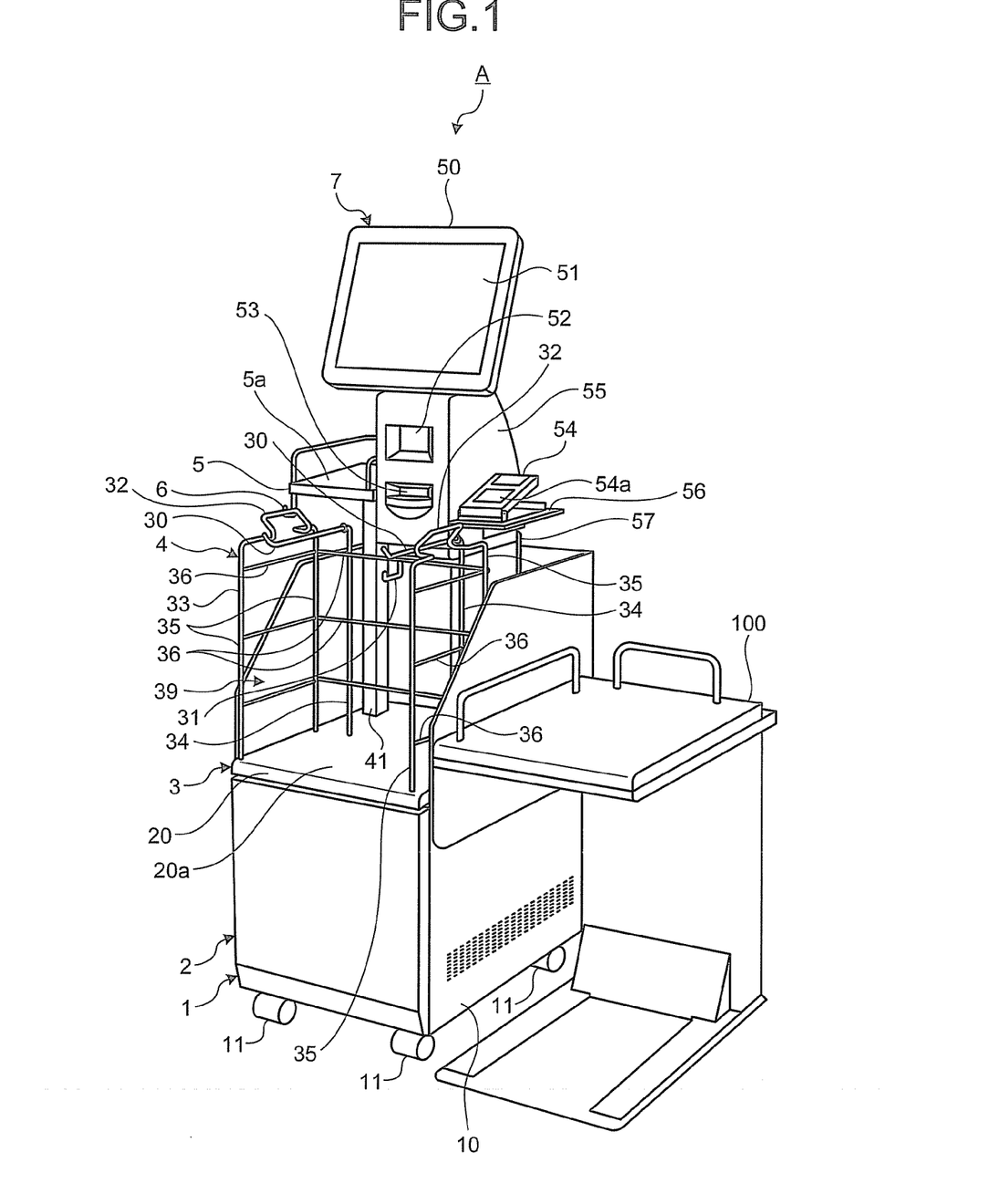
FIG. 1 is a perspective view of an apparatus with bag supporting table including a bag supporting table according to a first embodiment shown together with a basket placing table.

A first embodiment is explained with reference to FIGS. 1 to 8. As shown in FIG. 1, the apparatus with bag supporting table A includes the bag supporting table 1 and an input and output unit 7. The bag supporting table 1 includes a table main body 2, a weighing scale 3, a shopping-bag supporting section 4, a temporary placing table 5, and a hook for auxiliary bags 6. The weighing scale 3 is provided on the table main body 2. The shopping-bag supporting section 4 is fixed to a placing table 20 of the weighing scale 3. The temporary placing table 5 is fixed to the placing table 20. The hook for auxiliary bags 6 is an auxiliary-bag supporting section configured to support auxiliary bags 400. The input and output unit 7 is arranged above the weighing scale 3. A basket placing table 100 is arranged on a side of the bag supporting table 1.

The table main body 2 includes a first housing 10 and the placing table 20. The placing table 20 is arranged above the first housing 10. The first housing 10 is formed in a rectangular box shape opened on the upper surface thereof. The placing table 20 is movable up and down with respect to the first housing 10. The placing table 20 covers the upper surface opening of the first housing 10. Wheels 11 are attached to four corners of the bottom surfaces of the first housing 10. The wheels 11 enable the bag supporting table 1 to travel. The table main body 2 has a control unit 8 (see FIG. 6) housed therein. The control unit 8 controls units of the supporting table 1.

The weighing scale 3 includes the placing table 20 and a weighing unit (not shown). The weighing unit is located below the placing table 20 and coupled to the placing table 20. The weighing unit is housed on the inside of the first housing 10 and fixed to the first housing 10. The weighing unit measures a downward load applied to the placing table 20 and outputs the load to the control unit 8 as an electric signal. The weighing unit includes, for example, a load cell. A predetermined range extending from the front edge to the back side on the placing table 20 is a shopping bag placing area 20a. The shopping bag placing area 20a is an area on which a shopping bag 200 supported by the shopping-bag supporting section 4 is placed.

Figure 2:
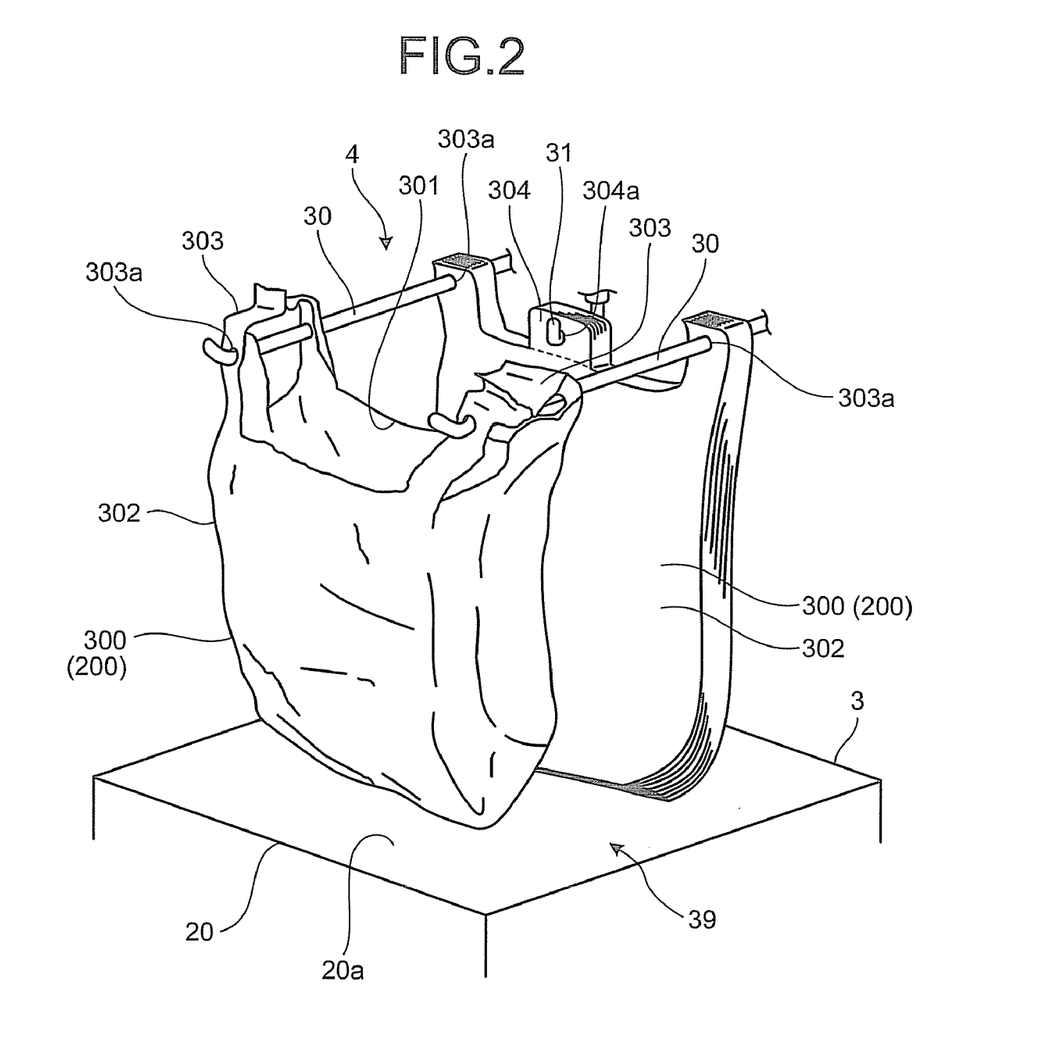
FIG. 2 is a perspective view of a shopping-bag supporting section according to the first embodiment.

The shopping-bag supporting section 4 supports a shopping bag. The shopping bag is a bag that stores commodities purchased by a customer. The shopping bag has a pair of grips. In this embodiment, a register bag 300 and a "my bag" (not shown) is applied as the shopping bag. The register bag 300 is a shopping bag provided to the customer by a store. The "my bag" is a shopping bag carried into the store by the customer. Specifically, as shown in FIG. 2, the register bag 300 includes a storing section 302, a pair of grips 303, and a pair of hooking pieces 304. An opening 301 is formed on the upper surface of the storing section 302. The pair of grips 303 are continuously provided in an upper part of the storing section 302. The pair of hooking pieces 304 are located between the pair of grips 303. Through holes 303a are formed in the pair of grips 303. Hooking holes 304a are formed in the hooking pieces 304. Perforations 402b are formed in connecting sections with the storing section 302 in the hooking pieces 304. The hooking pieces 304 can be separated from the storing section 302 by the perforations 402b. When the register bag and the "my bag" are simply explained as the shopping bag without being distinguished, the shopping bag is denoted by reference numeral 200.

The shopping-bag supporting section 4 includes a pair of left and right first hooking sections 30, a hook 31, and a pair of left and right second hooking sections 32. The pair of left and right first hooking sections 30 are arranged to be spaced apart from and opposed to each other and support the register bag 300 in an opened state. The pair of left and right second hooking sections 32 are arranged to be spaced apart from and opposed to each other and support the "my bag" in an opened state. In other words, the shopping-bag supporting section 4 includes, as pairs of supporting sections, the pair of first hooking sections 30 and the pair of second hooking sections 32. In the shopping-bag supporting section 4, a supporting structure 33 fixes the first hooking sections 30, the hook 31, and the second hooking sections 32 to the placing table 20.

The supporting structure 33 includes first columns 34, second columns 35, and beam members 36. The supporting structure 33 is vertically provided around the shopping bag placing area 20a in the placing table 20. The first columns 34 support the first hooking sections 30. The second columns 35 support the second hooking sections 32. The beam members 36 are laid between the columns 34 and 35.

The second columns 35 are vertically provided on the front, the rear, the left, and the right in a front section of the placing table 20 one by one. Two second columns 35 are vertically provided on the placing table 20 between the first column 34 on the rear right and the first column 34 on the rear left. The plural beam members 36 are respectively laid between the first column 34 on the front right and the first column 34 on the rear right, between the first column 34 on the front left and the first column 34 on the rear left, and between the first column 34 on the rear right and the first column 34 on the rear left. The second columns 35 are fixed to the beam members 36 laid between the first columns 34 on the rear right and the rear left. A beam member is not provided between the two first columns 35 on the front side. Therefore, the customer can place the shopping bag 200 on and take the shopping bag 200 away from the shopping bag placing area 20a in the placing table 20 from the front of the placing table 20.

The first hooking sections 30 are formed by bar-like arm members extending forward from the upper ends of the first columns 34. The first hooking sections 30 are supported by the first columns 34 in a cantilever manner. The first hooking sections 30 are located above the shopping bag placing area 20a in the placing table 20 and fixed to the placing table 20 via the second columns 35. As shown in FIG. 2, the pair of first hooking sections 30 are respectively inserted into the grips 303 of the register bag 300 to hook the grips 303 of the register bag 300 and support the register bag 300 in an opened state. In other words, one first hooking section 30 hooks one grip 303 of the register bag 300 and the other first hooking section 30 hooks the other grip 303 of the register bag 300. The first hooking section 30 is formed by bending a single bar member of metal to be integrally formed with the first column 34.

As shown in FIGS. 1 and 2, the hook 31 is arranged between the pair of first hooking sections 30. The hook 31 projects forward from the beam member 36 at the top stage among the beam members 36 laid between the left and right first columns 34 on the rear side. The hook 31 is located above the placing table 20. The hook 31 hooks the hooking holes 304a of the hooking pieces 304 of the register bag 300 and hangs and supports the register bag 300.

When the customer jams commodities in the register bag 300 in a state in which the folded register bag 300 is hung and supported by the hook 31 and the first hooking sections 30, the customer separates the hooking pieces 304 from the register bag 300 and draws the register bag 300 forward to open the same. The register bag 300 in the opened state is supported while being hooked by the pair of first hooking sections 30. In other words, the pair of first hooking sections 30 can support the register bag 300 in both the opened state and a closed state in this embodiment. The bottom of the register bag 300 supported by the first hooking sections 30 in this way is supported by the placing table 20.

The second hooking sections 32 are formed in a hook shape. The second hooking sections 32 are connected to the first columns 34 and fixed to the placing table 20 via the first column 34. Specifically, the second hooking section 32 on the right side is connected to the front and rear two first columns 34 on the right side. The second hooking section 32 on the left side is connected to the front and rear two second columns 35 on the left side. The pair of second hooking sections 32 are located above the shopping bag placing area 20a in the placing table 20. The second hooking section 32 is formed by bending a single bar member of metal to be integrally formed with the first column 34. The pair of second hooking sections 32 respectively hook the grips of the "my bag" and support the "my bag" in an opened state. In other words, one second hooking section 32 hooks one grip of the "my bag" and the other second hooking section 32 hooks the other grip of the "my bag". The bottom of the "my bag" supported by the pair of second hooking sections 32 in this way is supported by the placing table 20.

An arrangement area 39 for the register bag 300 supported in the opened state by the pair of first hooking sections 30 and the "my bag" supported in the opened state by the pair of second hooking sections 32 is formed by an area above the shopping bag placing area 20a. In other words, the pair of first hooking sections 30 and the pair of second hooking sections 32 arrange the shopping bag 200 in the arrangement area 39. The pair of first hooking sections 30 are arranged between the pair of second hooking sections 32. According to such arrangement, a first arrangement area where the register bag 300 is arranged by the pair of first hooking sections 30 and a second arrangement area where the "my bag" is arranged by the pair of second hooking sections 32 are at least partially the same. A combined area of the first arrangement area and the second arrangement area is the arrangement area 39.

The shopping-bag supporting section 4 having the configuration explained above is fixed to the placing table 20 as explained above. Therefore, the placing table 20 supports the shopping-bag supporting section 4 and receives a load of the shopping bag 200 supported by the shopping-bag supporting section 4.

The temporary placing table 5 is a table on which commodities are temporarily placed. Specifically, the upper surface of the temporary placing table 5 is a substantially flat placing surface 5a. Commodities, commodity codes of which are read by a scanner 52, are temporarily placed on the placing surface 5a before being stored in the shopping bag 200 supported by the shopping-bag supporting section 4 or the auxiliary bag 400 explained later. A drop preventing member 40 along a pair of left and right side edges and a rear edge of the placing surface 5a is vertically provided on the placing surface 5a. The drop preventing member 40 is formed by combining bar members. The drop preventing member 40 prevents the customer from touching the commodities placed on the temporary placing table 5 and dropping the commodities from the temporary placing table 5. The temporary placing table 5 is fixed to the placing table 20 via a third column 41. The lower end of the third column 41 is fixed to the upper surface of the placing table 20. The upper end of the third column 41 is fixed to the lower surface of the temporary placing table 5.

Figure 3:
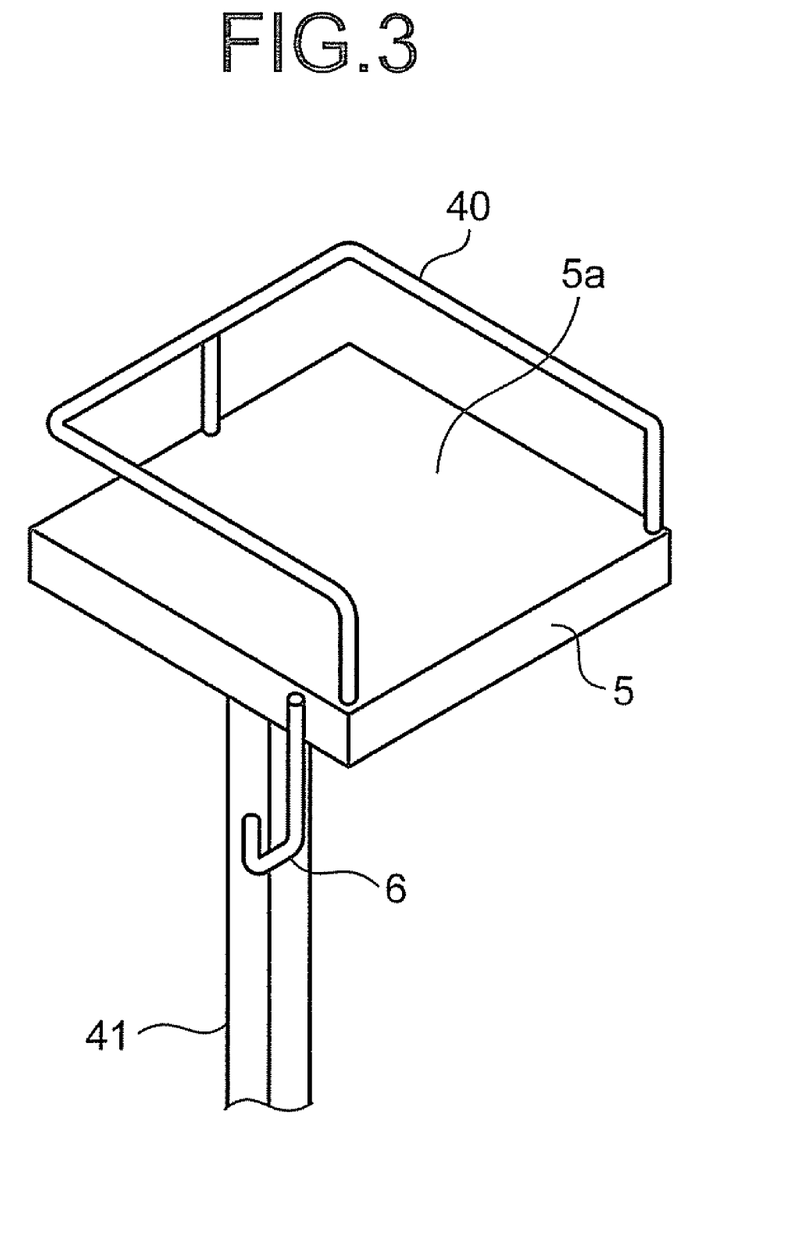
FIG. 3 is a perspective view of a temporary placing table and a hook for auxiliary bags according to the first embodiment.

The hook for auxiliary bags 6 configured to support the auxiliary bags 400 is provided on a side of the temporary placing table 5. As shown in FIGS. 1 and 3, the hook for auxiliary bags 6 is formed in a substantially J-shape. The upper end of the hook for auxiliary bags 6 is fixed to the side of the temporary placing table 5. The hook for auxiliary bags 6 is fixed to the temporary placing table 5 by welding, bonding, screwing, or the like. The hook for auxiliary bags 6 is arranged on the outer side of the arrangement area 39 for the register bag supported in the opened state by the pair of first hooking sections 30 and the "my bag" supported in the opened state by the pair of second hooking sections 32. The hook for auxiliary bags 6 supports the auxiliary bags 400 to allow the auxiliary bags 400 to be detached one by one.

The auxiliary bag 400 is a bag different from the shopping bag 200. The auxiliary bag 400 is a bag for storing a commodity such as a water-containing commodity and used for storing commodity stored therein in the shopping basket 200. The auxiliary bag 400 is provided to the customer by the store and is, for example, a plastic bag smaller than the shopping bag 200. The auxiliary bag 400 includes only a storing section and does not have grips.

Figure 4:
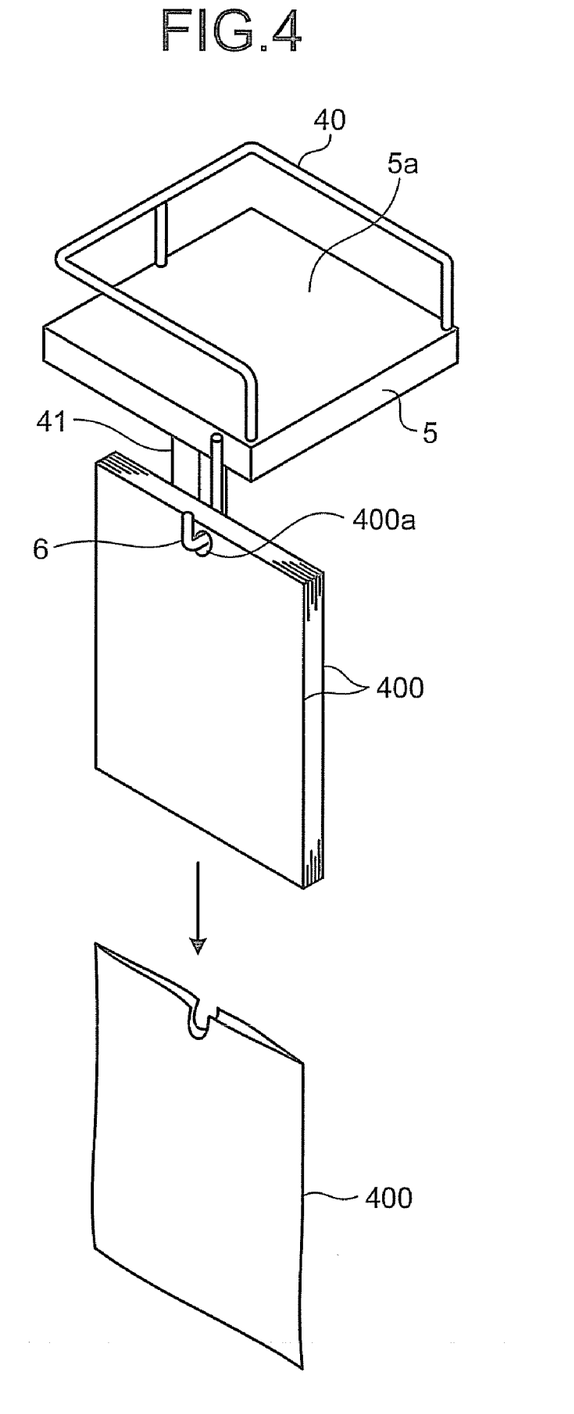
FIG. 4 is an explanatory diagram for explaining a method of detaching an auxiliary bag from the hook for auxiliary bags according to the first embodiment.
Figure 5:
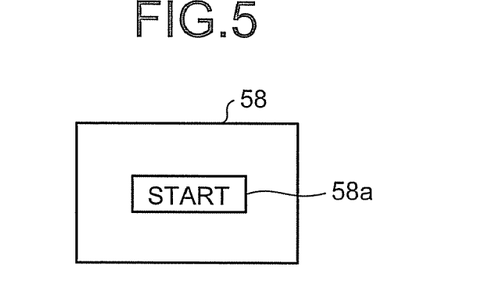
FIG. 5 is a diagram of a start screen according to the first embodiment.

As shown in FIG. 4, the hook for auxiliary bags 6 is inserted through hooking holes 400a formed at the upper ends of the auxiliary bags 400 and hooks and supports the auxiliary bags 400. The hook for auxiliary bags 6 can hook the plural auxiliary bags 400. The hook for auxiliary bags 6 are fixed to the placing table 20 via the temporary placing table 5 and the third column 41. In other words, the placing table 20 supports the hook for auxiliary bags 6 via the temporary placing table 5 and the third column 41. The placing table 20 receives a load of the auxiliary bags 400 supported by the hook for auxiliary bags 6. When the customer uses the auxiliary bag 400, the customer pulls down the auxiliary bag 400, breaks upper parts of the hooking holes 400a with the hook for auxiliary bags 6, and detaches the auxiliary bag 400 from the hook for auxiliary bags 6.

The input and output unit 7 includes, as shown in FIG. 1, a display 50, a touch panel 51, the scanner 52, a printer 53, and a settlement device 54. The touch panel 51 is laminated and arranged on a screen of the display 50. The display 50 is arranged above the placing table 20. The scanner 52 is arranged above the placing table 20 and below the display 50. The printer 53 is arranged below the scanner 52. The settlement device 54 is arranged on a side of the printer 53. The display 50, the scanner 52, and the printer 53 are attached to a second housing 55. The settlement device 54 is set on a supporting table 56 projecting from a side of the second housing 55. The second housing 55 is fixed to the first housing 10 of the table main body 2 via a supporting member 57. In other words, the display 50, the scanner 52, the printer 53, and the settlement device 54 are supported by the bag supporting table 1.

The display 50 is, for example, a liquid crystal display. The display 50 is controlled by the control unit 8 to display predetermined matters. The display 50 displays, for example, a start screen 58 shown in FIG. 5. A start button 58a is displayed on the start screen 58.

The touch panel 51 recognizes the position of an XY coordinate on the panel touched by an operator such as a customer and acquires coordinate data. The touch panel 51 inputs a signal corresponding to the acquired coordinate data to the control unit 8. The control unit 8 recognizes a button or the like displayed on the display 50 corresponding to the coordinate touched on the touch panel 51 to recognize the button or the like designated by the touch panel 51. The touch panel 51 functions as declaring means. When the start button 58a of the start screen 58 is touch-operated, the touch panel 51 declares the start of weighing of commodities.

The scanner 52 optically reads information such as a commodity code attached to a commodity in a form of a barcode. The scanner 52 inputs the read information to the control unit 8.

The printer 53 prints matters necessary for a receipt on a not-shown receipt sheet, which is elongated paper, and cuts a portion printed with the necessary matters from the receipt sheet, and issues the portion as a receipt.

The settlement device 54 includes a reading unit 54a. The reading unit 54a performs short-distance radio communication with a non-contact IC card (not shown) held over the reading unit 54a. The non-contact IC card stores therein information related to settlement. The reading unit 54a reads the information related to settlement stored in the non-contact IC card through the radio communication. The reading unit 54a performs the radio communication with the non-contact IC card using a radio wave for the near-distance radio communication used in, for example, radio frequency identification (RFID). The non-contact IC card stores therein, as the information related to settlement, information such as a balance of electronic money of a prepaid type, card identification information, and customer identification information.

Figure 6:
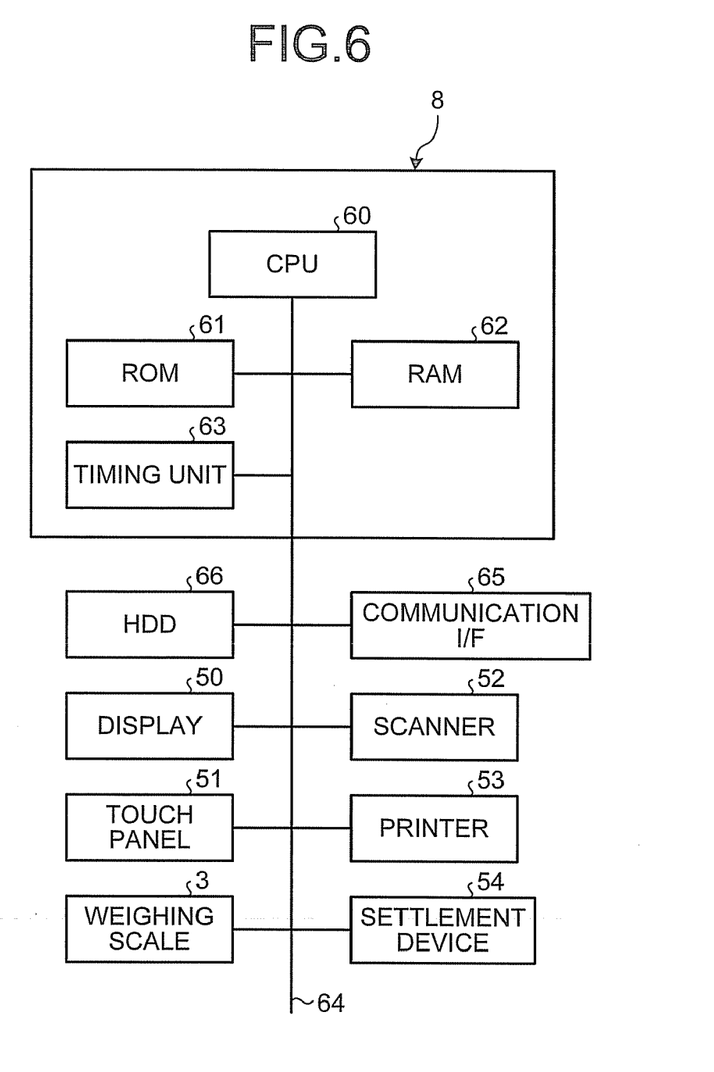
FIG. 6 is a block diagram of electric connection of units of the bag supporting table according to the first embodiment.

As shown in FIG. 6, the control unit 8 includes a central processing unit (CPU) 60, a read only memory (ROM) 61, a random access memory (RAM) 62, and a timing unit 63. The control unit 8 is a computer. The CPU 60 centrally controls the units. The ROM 61 stores therein in advance stationary data such as a start program. The RAM 62 forms various buffers such as a sales buffer and a printing buffer and rewritably stores various data. The timing unit 63 measures date or date and time. The ROM 61, the RAM 62, and the timing unit 63 are connected to the CPU 60 via a bus line 64 such as an address bus or a data bus. An initial value storage area for storing an initial value of weighing by the weighing scale 3 is formed in the RAM 62.

Besides the display 50, the touch panel 51, the weighing scale 3, the scanner 52, the printer 53, and the settlement device 54, a communication interface ("I/F" in the FIG. 65 and a hard disk drive (HDD) 66 as a storage device are connected to the bus line 64 connected to the CPU 60. The communication interface 65 executes communication with an external apparatus.

The HDD 66 stores therein, besides a computer program for causing the control unit 8 to operate, for example, a commodity master file and a sales file that stores sales data and the like (both of which are not shown in the figure). The commodity master file is a file that stores commodity names, unit prices, weights, and the like in association with commodity codes. The computer program stored in the HDD 66 is written in the RAM 62 together with various files such as the commodity master file. This enables driving control of the units by the control unit 8.

A method of using the bag supporting table 1 having the configuration explained above is explained. A customer places a shopping basket including commodities before checkout on the basket placing table 100 and causes the shopping-bag supporting section 4 to support the shopping bag 200 (the register bag 300 or the "my bag") in an opened state. The customer stands on the front side of the bag supporting table 1 and, after touch-operating the start button 58a of the start screen 58 displayed on the display 50, takes out the commodities in the shopping basket placed on the basket placing table 100, and brings the taken-out commodities close to the scanner 52 to cause the scanner 52 to read commodity codes attached to the commodities. The customer jams the commodities, the commodity codes of which are read by the scanner 52, in the shopping bag 200 supported by the shopping-bag supporting section 4 in an opened state. After the start button 58a is touch-operated, the display 50 displays a screen on which an end button is displayed.

When the customer jams the commodity, a commodity code of which is read by the scanner 52, in the shopping bag 200, the customer can detach the auxiliary bag 400 from the hook for auxiliary bags 6 and use the auxiliary bag 400 as desired. For example, the customer stores a water-containing commodity such as fish or fruit in the auxiliary bag 400 and jams the water-containing commodity stored in the auxiliary bag 400 in the shopping bag 200. In jamming the commodity, the customer can use the temporary placing table 5. For example, the customer can detach the auxiliary bag 400 from the hook for auxiliary bags 6 with a free hand by, after causing the scanner 52 to read a commodity code, placing a commodity such as a water-containing commodity before being stored in the auxiliary bag 400 on the temporary placing table 5. The customer takes down the commodity from the temporary placing table 5, stores the commodity in the auxiliary bag 400, and puts the commodity stored in the auxiliary bag 400 in the shopping bag 200. For example, the customer can also place a commodity that is easily crushed such as bread on the temporary placing table 5 and, after jamming other commodities in the shopping bag 200, take down the commodity from the temporary placing table 5 and directly put the commodity in the shopping bag 200.

When finishing jamming the commodities in the shopping bag 200, the customer touch-operates the end button displayed on the display 50, holds a non-contact IC card over the settlement device 54, and pays the prices with, for example, electronic money. Thereafter, the customer detaches the shopping bag 200 from the shopping-bag supporting section 4 and removes the shopping bag 200 from the bag supporting table 1.

Checkout processing executed by the CPU 60 of the bag supporting table 1 when the bag supporting table 1 is used according to the using method explained above is explained.

Figure 7:
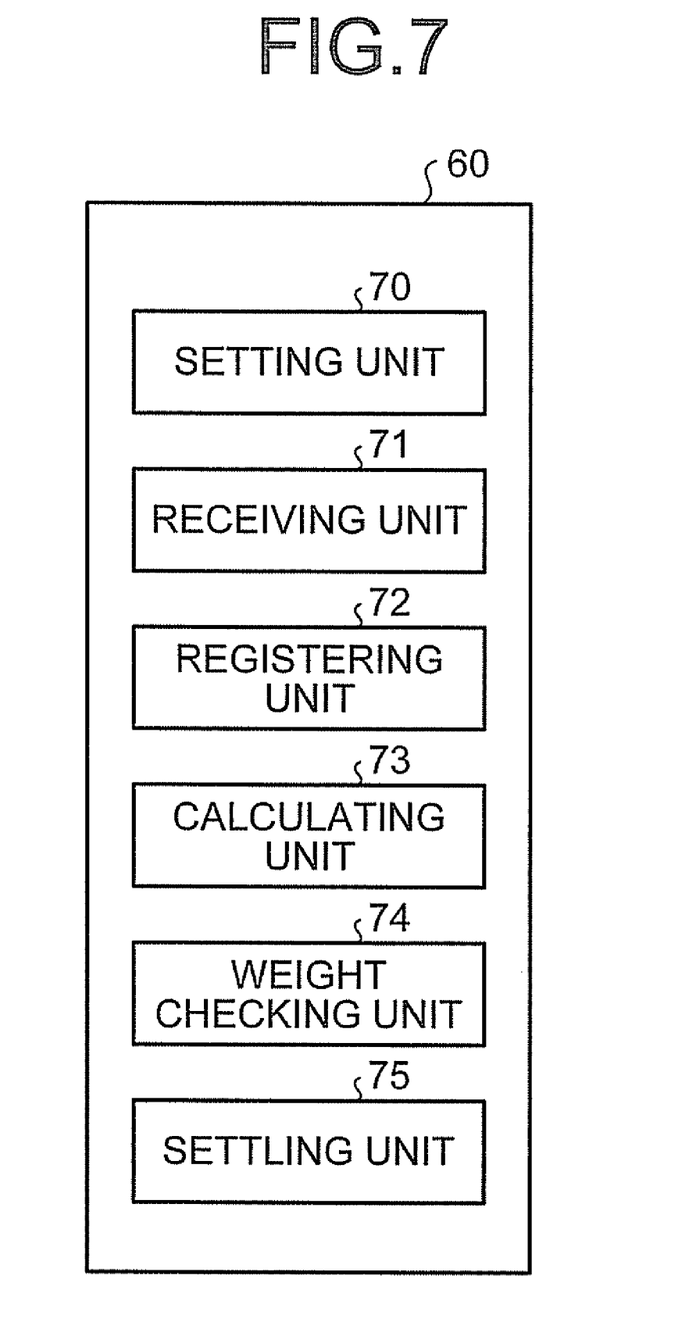
FIG. 7 is a block diagram of a functional configuration of a CPU of the bag supporting table according to the first embodiment.

In the checkout processing, as shown in FIG. 7, the CPU 60 realizes, according to a computer program, a setting unit 70 as setting means, a receiving unit 71 as receiving means, a registering unit 72 as registering means, a calculating unit 73 as calculating means, a weight checking unit 74 as weight checking means, and a settling unit 75 as settling means as functional units.

Figure 8:
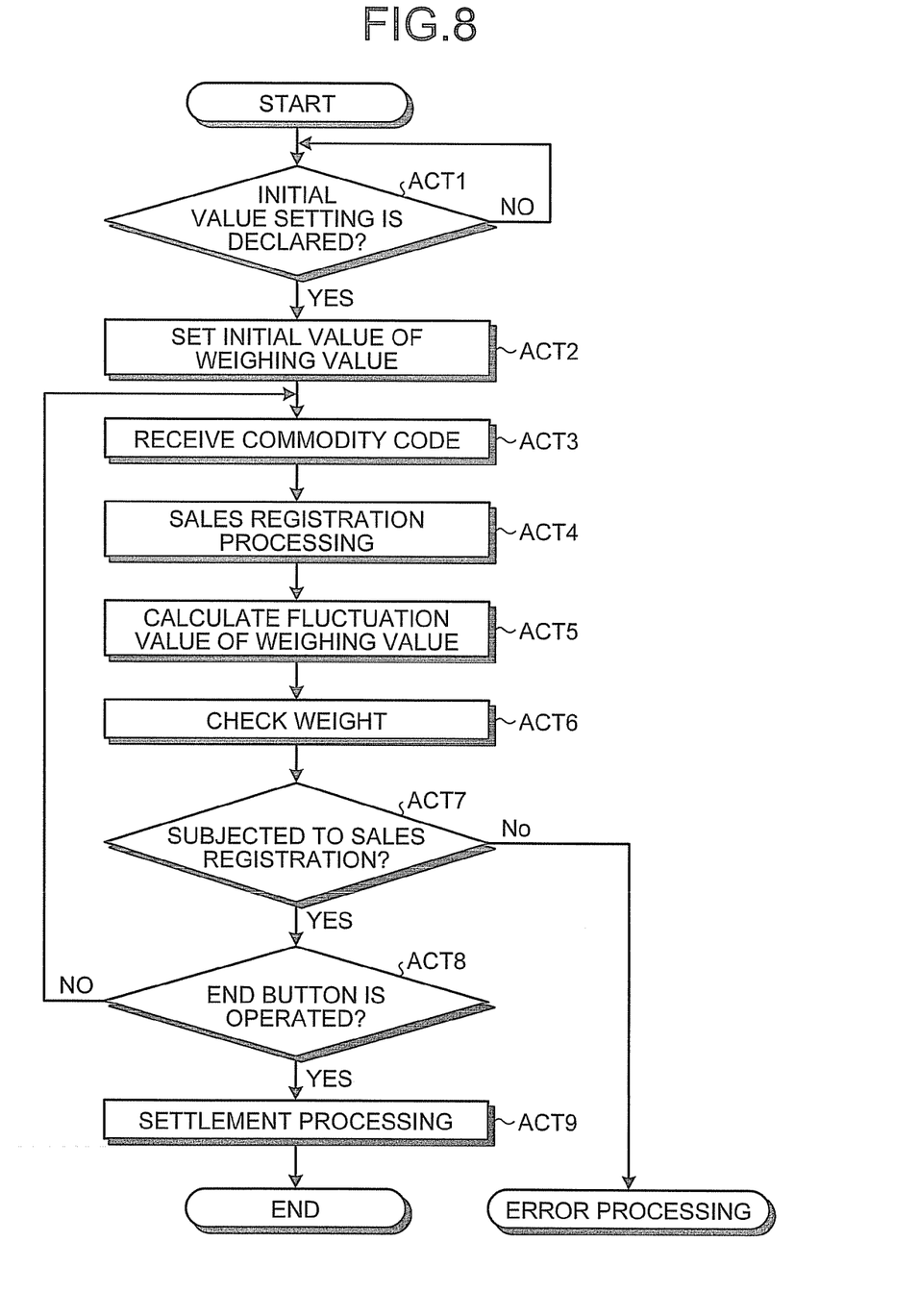
FIG. 8 is a flowchart for explaining a flow of checkout processing executed by the CPU of the bag supporting table according to the first embodiment.

A flow of the checkout processing is explained with reference to a flowchart shown in FIG. 8. As shown in FIG. 8, the CPU 60 stays on standby until the start of weighing of commodities is declared by the touch panel 51 according to touch-operation of the start button 58a of the start screen 58 (No in Act 1).

If the CPU 60 determines that the start of weighing of a commodity is declared (Yes in Act 1), the CPU 60 operates as the setting unit 70 and sets, as an initial value, a weighing value obtained by the weighing scale 3 when the start of the weighing of the commodity is declared (Act 2). Specifically, the CPU 60 causes the initial value storage area of the RAM 62 to store a weighing value of the weighing scale 3 at the time when the start of weighing of a commodity is declared on the basis of a signal received from the touch panel 51. The CPU 60 sets the weighing value as an initial value by causing the initial value storage area of the RAM 62 to store the weighing value. The CPU 60 causes the scanner 52 to start an operation for reading a commodity code and causes the display 50 to display the screen on which the end button is displayed.

Subsequently, the CPU 60 operates as the receiving unit 71 and receives input of the commodity code from the scanner 52 (Act 3). When the CPU 60 receives the input of the commodity code, the CPU 60 operates as the registering unit 72 and performs sales registration processing for the commodity, the input of the commodity code of which is received (Act 4). Specifically, the CPU 60 searches through the commodity master file, acquires commodity information such as a commodity name, a unit price, and weight corresponding to the input commodity code, creates sales data of the commodity on the basis of the acquired commodity information, and causes a storing unit such as the RAM 62 to store the sales data. The CPU 60 applies sales registration to the commodity by storing the sales data in this way. The CPU 60 causes the display 50 to display the unit price and the like of the commodity information of the commodity. Further, the CPU 60 calculates a total amount of commodities subjected to the sales registration so far, causes the storing unit such as the RAM 62 to store the total amount, and causes the display 50 to display the total amount.

The CPU 60 operates as the calculating unit 73 and calculates a fluctuation value of a weighing value obtained by the weighing scale 3 from the initial value stored in the initial value storage area of the RAM 62 (Act 5). Specifically, after the weighing value of the weighing scale 3 increases because a commodity is placed on the placing table 20 since the CPU 60 receives the commodity code in Act 3, the CPU 60 sets, as a target weighing value, a weighing value at the time when the weighing value of the weighing scale 3 is stabilized at a substantially fixed value. The CPU 60 subtracts the initial value stored in the initial value storage area of the RAM 62 from the target weighing value to calculate a fluctuation value. In the following explanation, this fluctuation value is also referred to as actual weight.

The CPU 60 operates as the weight checking unit 74 and performs weight check (Act 7). Specifically, the CPU 60 determines whether the actual weight calculated in Act 5 has identity with the weight of the commodity (hereafter also referred to as theoretical weight) searched and stored in the RAM 62 in Act 4 to determine whether the commodity weighed by the weighing scale 3 is the commodity subjected to the sales registration in Act 4. If a difference between the actual weight and the theoretical weight is within a specified range, the CPU 60 determines that the actual weight has identity with the theoretical weight and determines that the commodity weighed by the weighing scale 3 is the commodity subjected to the sales registration. On the other hand, if the difference between the actual weight and the theoretical weight is outside the specified range, the CPU 60 determines that the actual weight does not have identity with the theoretical weight and determines that the commodity weighed by the weighing scale 3 is not subjected to the sales registration. After performing the determination, the CPU 60 updates the value of the initial value storage area of the RAM 62 with the target weighing value obtained in Act 3 and sets the target weighing value as a new initial value.

If the CPU 60 determines that the commodity weighed by the weighing scale 3 is subjected to the sales registration (Yes in Act 7), if the end button is not touch-operated (No in Act 8) and a commodity code is input, the CPU 60 returns to Act 3, receives the input of the commodity code, and repeatedly performs the processing in Acts 3 to 7. On the other hand, if the CPU 60 determines that the commodity weighed by the weighing scale 3 is not subjected to the sales registration (No in Act 7), the CPU 60 performs specified error processing.

If the CPU 60 determines that the end button displayed on the display 50 is touch-operated (Yes in Act 8), the CPU 60 operates as the settling unit 75 and executes the settlement processing (Act 9). In the settlement processing, the CPU 60 calculates the price of the commodity subjected to the sales registration and causes the display 50 to display the calculated amount. The CPU 60 drives the settlement device 54 to perform settlement between the settlement device 54 and a non-contact IC card. The settlement device 54 reads information such as a balance of electronic money and card identification information stored in the non-contact IC card held over the settlement device 54. Thereafter, the settlement device 54 causes the non-contact IC card to deduct the amount of the price from the balance of the electronic money. The CPU 60 causes the printer 53 to issue a receipt of the transaction. The CPU 60 associates the amount of the price of the commodity with the card identification information read by the settlement device 54 and generates charge information. The charge information is transmitted to a server of an electronic money management company at predetermined timing. Cash equivalent to the amount of the price included in the charge information is transferred by the processing in the server to a deposit account designated by the store from the electronic money management company.

As explained above, the bag supporting table 1 according to this embodiment includes the hook for auxiliary bags 6. The hook for auxiliary bags 6 supports the auxiliary bags 400 to allow the auxiliary bags 400 to be detached one by one. Therefore, the customer can use the auxiliary bag 400 by detaching the auxiliary bag 400 from the hook for auxiliary bags 6. This makes it possible to realize improvement of convenience of the bag supporting table 1.

The bag supporting table 1 according to this embodiment includes the temporary placing table 5 on which a commodity is temporarily placed. Therefore, the customer can detach the auxiliary bag 400 from the hook for auxiliary bags 6 in a state in which commodity before being stored in the shopping bag 200 is placed on the temporary placing table 5. Consequently, since the commodity is not an obstacle when the customer detaches the auxiliary bag 400 from the hook for auxiliary bags 6, the customer can easily detach the auxiliary bag 400 from the hook for auxiliary bags 6.

In this embodiment, the hook for auxiliary bags 6 is provided in the temporary placing table 5. Therefore, the temporary placing table 5 and the hook for auxiliary bags 6 are located relatively close to each other. Consequently, the customer can easily perform work for, after placing a commodity on the temporary placing table 5, detaching the auxiliary bag 400 from the hook for auxiliary bags 6 and storing the commodity placed on the temporary placing table 5 in the auxiliary bag 400 detached from the hook for auxiliary bags 6.

The bag supporting table 1 according to this embodiment includes the weighing scale 3 configured to weigh a load applied on the placing table 20. The placing table 20 supports the pairs of hooking sections (the pair of first hooking sections 30 and the pair of second hooking sections 32) and the hook for auxiliary bags 6. The placing table 20 receives a load by the shopping bag 200 supported by the pairs of the hooking sections (the pair of first hooking sections 30 and the pair of second hooking sections 32) and the auxiliary bags 400 supported by the hook for auxiliary bags 6. Therefore, the weighing scale 3 weighs a load applied on the placing table 20 including the weight of the shopping bag 200 supported by the pairs of hooking sections (the pair of first hooking sections 30 and the pair of second hooking sections 32) and the auxiliary bags 400 supported by the hooks for auxiliary bags 6.

The bag supporting table 1 according to this embodiment includes the touch panel 51 as declaring means, the setting unit 70 as setting means, and the calculating unit 73 as calculating means. The touch panel 51 declares the start of weighing of a commodity. The setting unit 70 sets, as an initial value, a weighing value obtained by the weighing scale 3 when the start of the weighing of the commodity is declared. The calculating unit 73 calculates a fluctuation value of the weighing value obtained by the weighing scale 3 from the initial value set by the setting unit 70. Therefore, for example, before placing the commodity on the placing table 20 or the temporary placing table 5, the customer operates the touch panel 51 and causes the touch panel 51 to declare the start of the weighing of the commodity. After the declaration, the customer places the commodity on the placing table 20 or the temporary placing table 5. Consequently, irrespective of the number of the auxiliary bags 400 supported by the hook for auxiliary bags 6 and the number of the register bags 300 supported by the pair of hooking sections 30, the bag supporting table 1 can accurately weigh the weight of the commodity placed on the placing table 20 of the weighing scale 3. When the "my bag" is used, the bag supporting table 1 can accurately weigh, by causing the second hooking sections 32 to support the "my bag" before declaring the start of weighing of a commodity, the weight of the commodity placed on the placing table 20 of the weighing scale 3.

Second Embodiment

Figure 9:
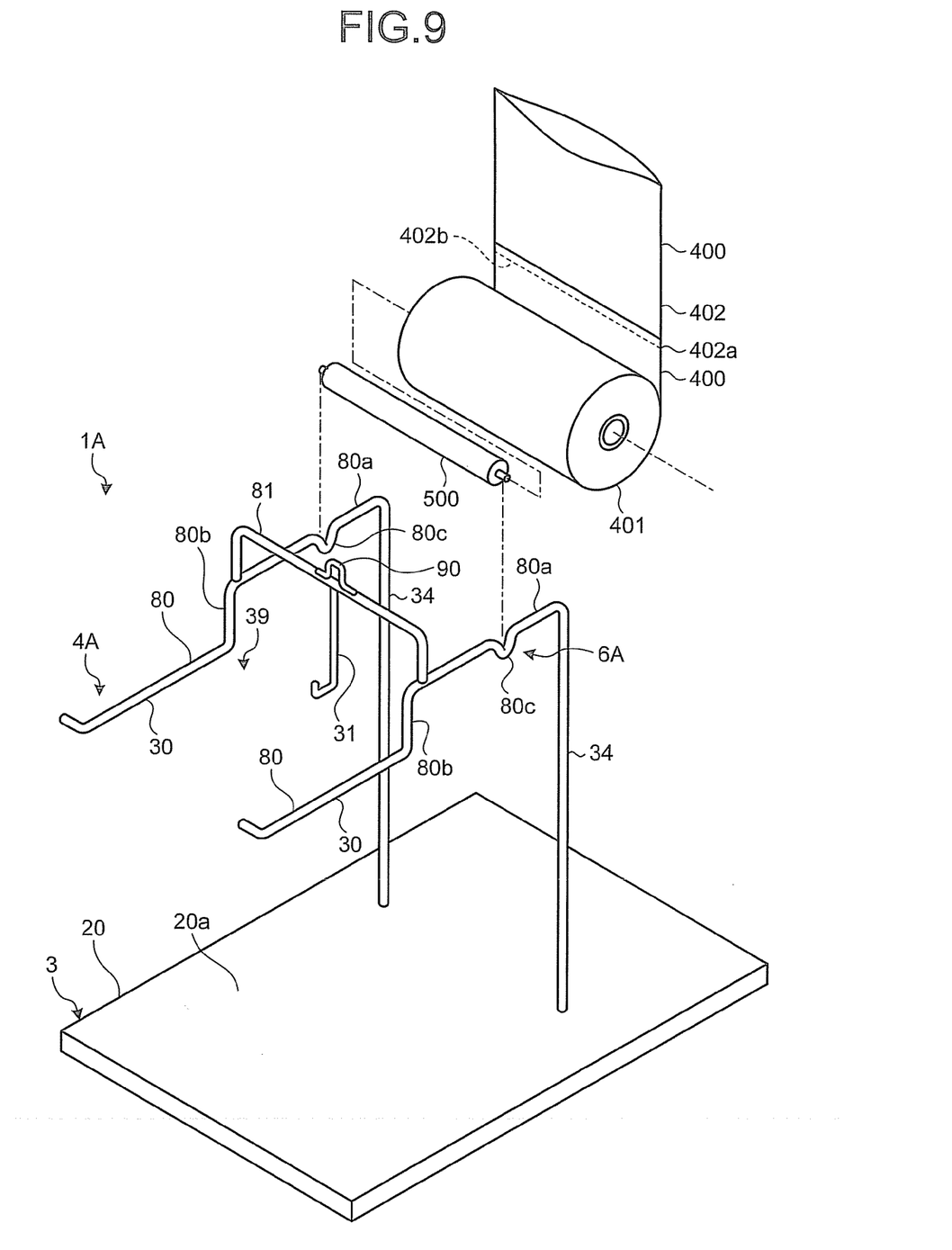
FIG. 9 is a perspective view of a main part of a bag supporting table according to a second embodiment.
Figure 10:
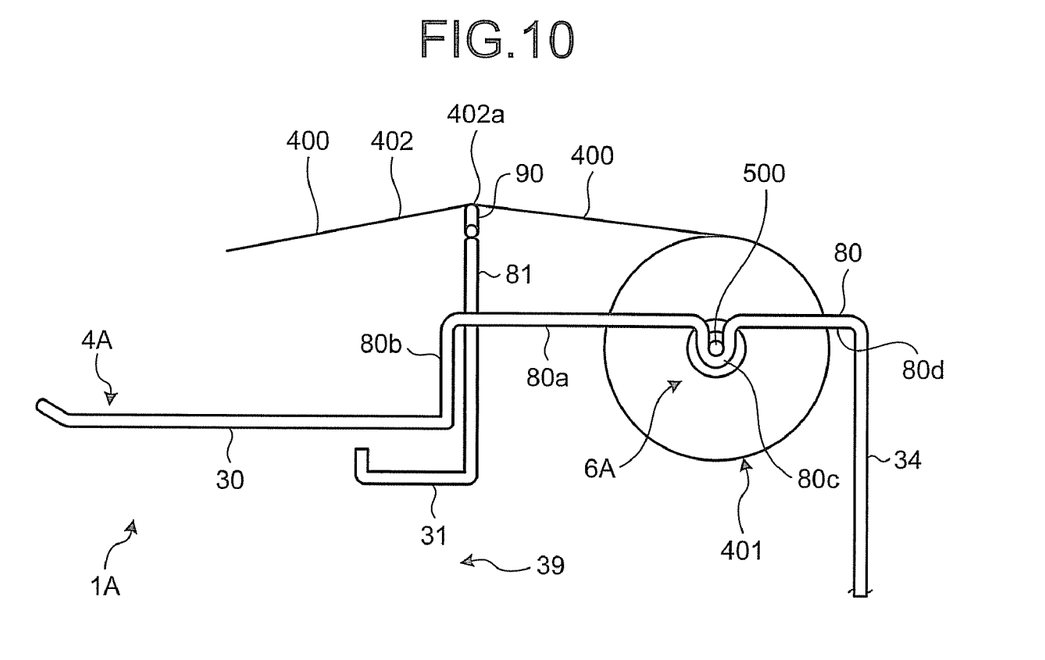
FIG. 10 is a side view of the main part of the bag supporting table in a state in which a roll body is set according to the second embodiment.

A second embodiment is explained with reference to FIGS. 9 and 10. Components same as those in the first embodiment are denoted by the same reference numerals and signs and redundant explanation of the components is omitted.

A bag supporting table 1A according to this embodiment is the same as the bag supporting table 1 according to the first embodiment in a basic configuration but is different in a shopping-bag supporting section 4A and an auxiliary-bag supporting section 6A.

The shopping-bag supporting section 4A includes a pair of arm members 80. The pair of arm members 80 are arranged to be opposed to each other. The pair of arm members 80 respectively extend forward from the upper ends of the first columns 34 and are supported by the first columns 34 in a cantilever mater. The first hooking sections 30 and the auxiliary-bag supporting section 6A are provided in the pair of arm members 80.

The arm members 80 include arm sections for auxiliary bags 80a, connecting sections 80b, and the first hooking sections 30. The arm sections for auxiliary bags 80a extend forward from the proximal ends of the arm members 80. The connecting sections 80b extend downward from the front ends of the arm sections for auxiliary bags 80a. The first hooking sections 30 extend forward from the lower ends of the connecting sections 80b. The arm members 80 are formed by bending a bar member.

The front ends of the pair of arm sections for auxiliary bags 80a are connected by a connecting member 81 extending to the left and right. The connecting member 81 is formed of a bar member and bend at both the ends to be fixed to the arm sections for auxiliary bags 80a by welding, bonding, or the like. The hook 31 is fixed to the connecting member 81. The hook 31 is provided to extend downward from substantially the center of the connecting member 81.

The auxiliary-bag supporting section 6A supports the auxiliary bags 400 to allow the auxiliary bags 400 to be detached one by one. Specifically, the auxiliary-bag supporting section 6A supports a roll body 401 including the plural auxiliary bags 400. The roll body 401 is formed by winding a sheet 402 in which the plural auxiliary bags 400 are continuously provided. Perforations 402b are formed in a connecting section 402a of the auxiliary bags 400 in the sheet 402. The auxiliary bags 400 can be separated (cut) in the connecting sections 402a.

The auxiliary-bag supporting section 6A includes bar receiving sections 80c. The bar receiving sections 80c are provided in the arm sections for auxiliary bags 80a of the arm members 80. The bar receiving sections 80c are integrally formed with the arm members 80 and form a part of the arm members 80. The pair of bar receiving sections 80c are located on a proximal ends 80d side of the arm members 80 in the first hooking sections 30 and located on a proximal ends side of the arm members 80 in the connecting member 81. The bar receiving sections 80c support both the ends of a core bar 500 inserted into the roll body 401. The bar receiving sections 80c is formed in a concave shape opened upward. Both the ends of the core bar 500 inserted into the roll body 401 are inserted into the pair of bar receiving sections 80c from above. The bar receiving sections 80c support both the ends of the inserted core bar 500. The auxiliary-bag supporting section 6A having such a configuration supports the roll body 401 to allow the roll body 401 to rotate. The sheet 402 can be drawn out forward from the roll body 401 supported by the auxiliary-bag supporting section 6A.

The bag-supporting table 1A includes a cutting section 90. The cutting section 90 cuts the sheet 402 in the connecting section 402a of the auxiliary bags 400. The cutting section 90 is fixed to the connecting member 81 and located in the front of the roll body 401 supported by the auxiliary-bag supporting section 6A. The cutting section 90 is formed in a projection shape and extends upward from substantially the center of the connecting member 81. The cutting section 90 cuts the auxiliary bags 400 in the connecting section 402a when the connecting section 402a of the auxiliary bags 400 is pressed.

In such a configuration, to separate the auxiliary bag 400 from the roll member 401, a customer draws out the sheet 402 forward from the roll body 401 supported by the auxiliary-bag supporting section 6A and presses the connecting section 402a of the auxiliary bags 400 in the drawn-out sheet 402 against the cutting section 90. Consequently, the cutting section 90 cuts the auxiliary bags 400 in the connecting section 402a and separates the auxiliary bag 400 from the sheet 402.

As explained above, the bag supporting table 1A according to this embodiment includes the pair of arm members 80 arranged to be spaced apart from and opposed to each other. The pair of arm members 80 respectively include the first hooking sections 30 and are supported in a cantilever manner. The auxiliary-bag supporting section 6A includes the bar receiving sections 80c. The bar receiving sections 80c are provided in the arm members 80. The bar receiving sections 80c are located on the proximal ends side of the arm members 80 in the first hooking sections 30. The bar receiving sections 80c support the cylindrical roll body 401 via the core bar 500 inserted into the roll body 401. Therefore, since the bar receiving sections 80c and the first hooking sections 30 are provided in the pair of arm members 80, it is possible to simplify the configuration of the bag supporting table 1A compared with a configuration in which bar receiving sections and first hooking sections are provided in separate members.

The bag supporting table 1A according to this embodiment includes the connecting member 81, the cutting section 90, and the hook 31. The connecting member 81 connects the pair of arm members 80. The cutting section 90 is provided in the connecting member 81. The cutting section 90 cuts the sheet 402 in the connecting section 402a of the auxiliary bags 400. The hook 31 is provided in the connecting member 81. The hook 31 hooks the hooking pieces 304 provided between the pair of first hooking sections 30 in the shopping bag 200 and hangs and supports the shopping bag 200. Therefore, since the cutting section 90 and the hook 31 are faced to the connecting members 81, it is possible to simplify the configuration of the bag supporting table 1A compared with a configuration in which a cutting section and a hook are provided in separate members.

The present invention is not limited to the embodiments explained above. Various other embodiments can be adopted without departing from the spirit of the present invention. For example, the auxiliary-bag supporting section may be a housing box in which plural auxiliary bags are housed and from which the auxiliary bags can be taken out one by one.

A computer program executed in the bag supporting table may be provided while being recorded in a computer-readable recording medium such as a CD-ROM, a flexible disk (FD), a CD-R, or a DVD as a file of an installable format or an executable format.

The computer program executed in the bag supporting table may be stored on a computer connected to a network such as the Internet and provided by being downloaded through the network. The computer program executed in the bag supporting table may be provided or distributed through the network such as the Internet.

According to the embodiment, it is possible to improve convenience of the bag supporting table that supports a shopping bag in an opened state.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A bag supporting table comprising:
a pair of hooking sections spaced apart from and opposed to each other and configured to support a shopping bag having a pair of grips in a state in which the shopping bag is opened, each of the hooking sections being configured to hook each of the grips;
an auxiliary-bag supporting section arranged on an outer side of an arrangement area for the shopping bag supported by the pair of hooking sections in the state in which the shopping bag is opened, the auxiliary-bag supporting section being configured to support auxiliary bags being different from the shopping bag, the auxiliary bags being detachable one by one; and
a temporary placing table having a placing surface on which a commodity is temporarily placed and a side surface extending from the placing surface downwardly, wherein
the auxiliary-bag supporting section is located at a front side of the side surface and below the placing surface, the auxiliary bags supported by the auxiliary-bag supporting section are located below the placing surface, the entire of the supported auxiliary bags is positioned more forward than a rear end of the placing surface, and a front end of the supported auxiliary bags is located more forward than the placing surface.

2. The table according to claim 1, further comprising a pair of arm members arranged to be spaced apart from and opposed to each other and configured to respectively include the hooking sections and supported in a cantilever manner, wherein
the auxiliary-bag supporting section includes bar receiving sections provided in the arm members and located on a proximal ends side of the arm members in the hooking sections, and
the bar receiving sections support a cylindrical roll body via a core bar inserted into the roll body, the roll body being formed by winding a sheet in which the plural auxiliary bags are continuously provided.

3. The table according to claim 2, further comprising:
a connecting member configured to connect the pair of the arm members;
a cutting section provided in the connecting member and configured to cut the sheet in a connecting section of the auxiliary bags; and
a hook provided in the connecting member and configured to hook hooking pieces provided between the pair of hooking sections in the shopping bag and hang and support the shopping bag.

4. The table according to claim 1, further comprising a weighing scale including a placing table and configured to weigh a load applied on the placing table, the placing table supporting the pair of hooking sections and the auxiliary-bag supporting section and receiving a load of the shopping bag supported by the pair of hooking sections and the auxiliary bags supported by the auxiliary-bag supporting section.

5. The table according to claim 4, further comprising:
a declaring unit configured to declare start of weighing of a commodity;
a setting unit configured to set, as an initial value, a weighing value obtained by the weighing scale when the start of the weighing of the commodity is declared; and
a calculating unit configured calculate a fluctuation value of the weighing value obtained by the weighing scale from the initial value.

6. An apparatus with bag supporting table comprising:
the bag supporting table according to claim 1; and
a scanner supported by the bag supporting table.

7. The apparatus according to claim 6, wherein
the bag supporting table includes a placing table configured to support the pair of hooking sections and the auxiliary-bag supporting section, and
the scanner is arranged above the placing table.

8. The apparatus according to claim 6, further comprising a display supported by the bag supporting table.

9. The apparatus according to claim 8, wherein
the bag supporting table includes a placing table configured to support the pair of hooking sections and the auxiliary-bag supporting section, and
the display is arranged above the placing table.

10. The apparatus according to claim 9, wherein the scanner is arranged above the placing table and below the display.

* * * * *